United States Patent
Saito et al.

(10) Patent No.: US 6,744,703 B2
(45) Date of Patent: Jun. 1, 2004

(54) CONTINUOUS RECORDING APPARATUS BY INTERPOLATING THE AUDIO SIGNAL DURING SEEKING OPERATION

(75) Inventors: Atsushi Saito, Chigasaki (JP); Kouki Uefune, Odawara (JP); Hideo Nagai, Hadano (JP); Motoyasu Tsunoda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 299 days.

(21) Appl. No.: 09/928,414

(22) Filed: Aug. 14, 2001

(65) Prior Publication Data

US 2002/0118609 A1 Aug. 29, 2002

(30) Foreign Application Priority Data

Feb. 27, 2001 (JP) ........................................ 2001-052115

(51) Int. Cl.[7] .............................................. G11B 21/08
(52) U.S. Cl. ................................ 369/30.18; 369/47.18; 381/94.4
(58) Field of Search ........................... 369/30.18, 30.23, 369/47.18, 47.17, 47.15, 47.54, 84, 83; 381/94.1, 94.4, 71.1, 71.3

(56) References Cited

U.S. PATENT DOCUMENTS

| 4,682,312 | A | * | 7/1987 | Furuya et al. | ........... 369/30.21 |
|---|---|---|---|---|---|
| 5,694,386 | A | * | 12/1997 | Hirajima et al. | ......... 369/47.25 |
| 5,774,435 | A | * | 6/1998 | Hirano | ..................... 369/47.22 |
| 5,878,184 | A | * | 3/1999 | Tajiri | ........................ 369/47.18 |
| 6,018,506 | A | * | 1/2000 | Okabe et al. | ............ 369/30.23 |

FOREIGN PATENT DOCUMENTS

| JP | 4-143970 A | * | 5/1992 | .............. 369/30.18 |
|---|---|---|---|---|
| JP | 4-292021 A | * | 10/1992 | .............. 369/30.18 |
| JP | 11-25661 | | 1/1999 | |
| JP | 2000-187974 | | 7/2000 | |
| JP | 2000-261703 | | 9/2000 | |
| JP | 2000-276858 | | 10/2000 | |

\* cited by examiner

*Primary Examiner*—Tan Dinh
(74) *Attorney, Agent, or Firm*—Mattingly, Stanger & Malur, PC (57) ABSTRACT

In an apparatus for recording continuous information of sound or the like, when a disk device generating a seek sound is used as recording means, such state is prevented that seek sound is mixed as noise and is recorded. In an input processing system of an audio signal in an apparatus for performing sound recording to storage means generating seek noise of the disk or the like, cut-off period 203 is provided by the period when the seek noise 201 is generated, and mixing of the seek noise 201 in the audio signal is prevented, and at the same time, the audio signal during the cut-off period 203 is interpolated by other means or the seek noise level previously set is subtracted.

20 Claims, 10 Drawing Sheets

VALUE OF SEEK DISTANCE →

| ADDRESS | DATA |
|---|---|
| 0 | 00000 |
| 1 | 00000 |
| 2 | 00001 |
| 3 | 00003 |
| ⋮ | ⋮ |
| N−3 | 00080 |
| N−2 | 00090 |
| N−1 | 00100 |
| N | 00100 |

→ VALUE OF CUT-OFF PERIOD

FIG. 3(b)

VALUE OF AUDIO SIGNAL →

| ADDRESS | DATA |
|---|---|
| 0 | 00100 |
| 1 | 00095 |
| 2 | 00075 |
| 3 | 00060 |
| ⋮ | ⋮ |
| N−3 | 00002 |
| N−2 | 00001 |
| N−1 | 00000 |
| N | 00000 |

→ VALUE OF CUT-OFF PERIOD

| ADDRESS | DATA |
|---|---|
| 0 | 0000 |
| 1 | 0000 |
| 2 | 0000 |
| 3 | 0000 |
| ⋮ | ⋮ |
| N−3 | 0230 |
| N−2 | 0250 |
| N−1 | 0260 |
| N | 0260 |

(S) ⟶ VALUE OF SEEK DISTANCE

⟶ (Ns) SEEK SOUND (NOISE) LEVEL

CONTINUOUS RECORDING APPARATUS BY INTERPOLATING THE AUDIO SIGNAL DURING SEEKING OPERATION

BACKGROUND OF THE INVENTION

In recent years, as an optical disk device or a magnetic disk device has a large throughput and is available at a low price, a disk device has been adopted as a medium for sound recording or picture recording in place of a conventional magnetic tape. Since the random access is easy in the disk device, it is advantageous in that location of the start of a picture or a sound can be rapidly performed, and while the picture recording or the sound recording is performed, any already recorded picture part or sound part can be reproduced.

When recording and reproducing of information are performed in the disk device, since the recording and reproducing head is positioned to the information track as an object, movement of a head, i.e., seek is generated. Attendant on the seek, also noise is generated.

Since the noise generated from a magnetic tape mechanism part is a continuous sound, the sound usually does not give unpleasant feeling for human ears. Such noise can be easily reduced relatively by a filter.

However, since the seek sound is generated only during seek, it is liable to be felt unpleasant in comparison with the continuous noise generated from the tape mechanism part. When the seek time is delayed, the seek sound can be reduced to some extent, but it is not complete. Also the delay of the seek time is apt to sacrifice the random access performance possessed inherently by the disk device; therefore this is inadvisable.

Thus in order to reduce the noise of the disk device including the seek sound, the noise measure technology has been proposed in various systems and structures.

Noise Measure Technology (1): JP-A 2000-187974 'Harddisk Recorder' discloses a structure in which working sound of harddisk drive is accommodated in a case whereby it is reduced. The intended device is an editing device (mixer device) having a console. Also the case is mounted on the lower surface of the substrate, whereby the effect of reducing the working sound is further enhanced.

Noise Measure Technology (2): JP-A 11-25661 'Optical Disk Device' and JP-A 2000-276858 'Recording and Reproducing Method and Device as well as Recording Medium' disclose a method and a structure in which in addition to a microphone being sound concentrating means, second sound concentrating means or a speaker is used, and difference component between both means is inputted in negative phase, whereby noise such as working sound is canceled.

Noise Measure Technology (3): JP-A 2000-261703 'Image pickup device' discloses a structure in which in order to reduce influence of heat or noise from the recording and reproducing part, when the image pickup device is used actually, the picture recording part and the sound recording part can be separated from the recording and reproducing part, and when the image pickup device is used, it can be accommodated compactly.

SUMMARY OF THE INVENTION

The present invention relates to a continuous information storage apparatus and a recording and reproducing apparatus containing a storage device, wherein when the apparatus is constituted having a sound concentrating part, the invention is in a method of reducing effectively an influence of a discontinuous noise such as a seek sound generated in the recording apparatus and the recording and reproducing apparatus, and an apparatus constitution and a control system using the method.

In a method of accommodating the apparatus in a case having the sound insulation effect as in the noise measure technology (1), it is difficult to radiate effectively the heat generated from the disk. Also since the case is necessary separately, the problem such as the weight increase and the cost raising will be produced.

Also as seen in the noise measure technology (2), in the case of providing the separate sound concentrating part in addition to the necessary sound concentrating part, when the trouble is produced in the added sound concentrating part, there is a fear of generating the bad influence on the contrary. Also the problem of cost increasing may be produced.

Also as in the case of the noise measure technology (3), the structure of varying the distance of the picture recording part and the sound recording part during the sound recording and during the accommodating provides convenience. However, since a moving part exists, there is a fear of producing the problem such as the deterioration of the durability.

The present invention provides the continuous information recording technology in the simple apparatus structure as it is where, when the sound information or the like is recorded in the storage means using a rotary storage medium, mixing of noise caused by the discontinuous noise such as the seek sound generated from the storage means is reduced effectively.

Also the continuous information recording technology is provided where the mixing of noise such as seek sound generated from the storage means is prevented when the sound information or the like is recoded in the storage means using the rotary storage medium, without producing the trouble such as the difficulty of heat radiation, the weight increase, and the cost increase.

Also the continuous information recording technology is provided where the mixing of the noise such as the seek sound generated from the storage means is prevented when the sound information or the like is recorded in the storage means using the rotary recording medium, without producing the trouble such as the cost increase due to addition of the excessive parts or the like or the noise increase due to the erroneous operation.

Also the continuous information recording technology is provided where the mixing of the noise such as the seek sound generated from the storage means is prevented when the sound information or the like is recorded in the storage means using the rotary storage medium, without providing a movable part which may cause the deterioration of the durability in the device body.

The present invention provides a continuous information recording apparatus including the recording medium accompanied by the head seek during the record reproducing of the information for the rotary storage medium, and at least sound concentrating means, wherein during the head seek generated when the input information from the sound concentrating means is recorded in the rotary sorage medium, the input information is cut off only during the prescribed cut-off period, and the input information omitted during the cut-off period is interpolated based on the input information in either before the cut-off period or after the cut-off period and is recorded in the rotary storage medium.

More specifically, for example, the seek instruction to the disk device to control the rotary storage medium such as a disk is always supervised, and only in the period that the level of the seek sound becomes highest, sound information from the sound concentrating part is cut off. The sound information omitted by the cut-off is interpolated using the information immediately before the sound information cut-off period or using the information immediately before and after the sound information cut-off period to eliminate unpleasant feeling.

The physical distance between the track on the disk that the existing head is positioned and the track in the destination is seized whereby time for the cut-off period is set to time which is effective to the seek noise reduction and does not give unpleasant feeling to sound information to be recorded.

Further in response to the amount of the sound information being the subject information inputted to the sound concentrating part, when the sound information is large in comparison with the level of the seek sound, the cut-off period is not provided.

By combining theses measures, it can be effectively reduced that the seek sound is recorded as the noise together with the sound information. Also in executing the present invention, excessive parts such as a case for confining the noise, and a microphone and a speaker to cancel the noise in the negative phase are not necessary at all, and parts to be newly added are little, whereby the present invention can be realized at a low cost in comparison with the prior art.

DESCRIPTION OF THE PREFERRED EMBODIMENTS

Embodiments of the present invention will now be described in detail referring to the accompanying drawings.

First Embodiment

Figure 1:
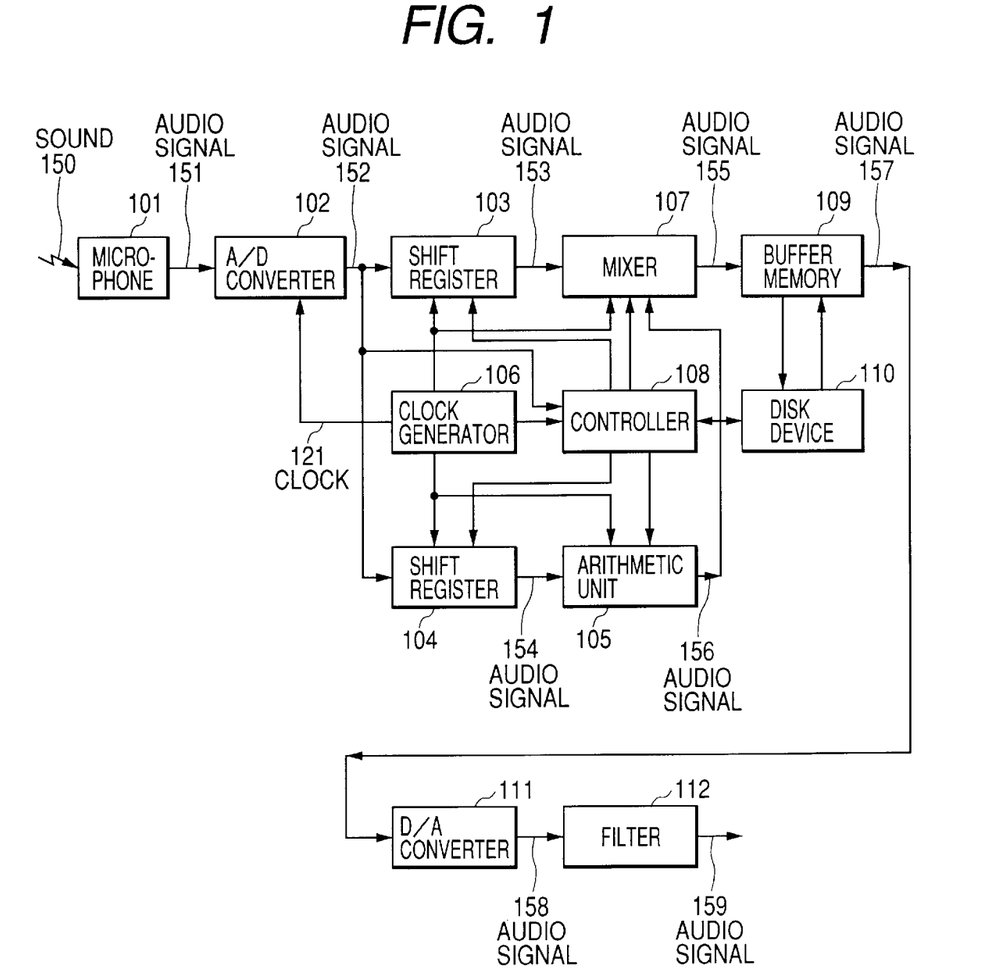
FIG. 1 is a block diagram showing an example of internal constitution of a continuous information recording apparatus being an embodiment of the invention.

FIG. 1 is a block diagram showing typical internal constitution of a continuous information recording apparatus according to an embodiment of the present invention. In this embodiment, a sound recording apparatus using a disk device as recording means will be described as an example. In the actual state, in addition to the constitution shown here, a display unit, an operation unit and other mechanism unit exist, but these are not specified in the executing of the present invention; therefore, these are not shown in the drawings.

Although not shown specifically, in the following description, for example, constitution will be described in which a rotary storage medium such as a disk medium and a disk device 110 as storage means provided with a head or the like performing information recording and reproducing operation in seek operation (moving/positioning operation in the disk diameter direction) for the rotary storage medium.

At first, operation in constitution in FIG. 1 will be described. A sound 150 being sound recording subject is converted into an electric signal by a microphone 101. The converted electric signal is designated as an audio signal 151 here. The audio signal 151 being analog signal is converted into an audio signal 152 being digital signal by an A/D converter 102. A clock 121 being reference during the conversion from the analog signal to the digital signal in the A/D converter 102 is generated by a clock generator 106. The clock 121 is a signal as reference of operation in components shown in FIG. 1, and is supplied to all components to be operated in synchronization in addition to the A/D converter 102.

The audio signal 152 converted into the digital signal by the A/D converter 102 is inputted to shift register 103. The shift register 103 has function that audio signals 152 being discrete in each bit in synchronization with the clock 121 are shifted in order. The shift register 103 is constituted by a flip-flop generally called D latch (delay latch). Flip-flops are connected in multiple stages and thereby level of the digital signal can be moved to the subsequent D latch for each one clock period by the D latch of one stage. The shift register 103 may be that in general constitution. In FIG. 1, the shift register 103 performs both functions in delay and storage.

On the other hand, a shift register 104 is provided separately from the shift register 103. Operation of the shift register 104 is similar to that in the shift register 103. The audio signal 153 passing through the shift register 103 is outputted as the audio signal 152 delayed by a time corresponding to the stage number of the D latches constituting the shift register 104 multiplied by the period of the clock 121. Also the audio signal 154 passing through the shift register 104 is outputted as the audio signal 152 delayed by the same time. The audio signal 153 is inputted to a mixer 107.

On the other hand, the audio signal 154 is subjected to the interpolation processing by an arithmetic unit 105. As described in detail in other figures, the arithmetic unit 105 has function that an audio signal being digital information omitted only in some period is interpolated. There are some interpolation methods. In the simplest case, a digital value immediately before the start of the omitting period is stored as it is, and then is combined by the primary approximation into the digital value immediately after the finishing of the omitting period. Otherwise, a plurality of digital values in the definite period including the digital value immediately before the start of the omitting period are approximated in polynomial, and the approximation formulas is applied as it is for the omitting period whereby the interpolation processing is performed. An audio signal 156 with the digital value in the omitting period interpolated by the arithmetic unit 105 is added to the audio signal 153 not having the information in the omitting period, whereby the noise removing without unpleasant feeling can be attained as described later.

A mixer 107 is a circuit for performing digital adding. This may be in constitution of a digital adder in general, but when each of the audio signal 153 and the audio signal 156 is a digital signal with the reference of zero value, the operation of dividing to ½ may be performed after the adding. If the dividing processing is not performed, in processing of a D/A converter 111 as described later, it is deemed that dynamic range is widened corresponding to this, and the processing may be performed. A specific example of processing of the arithmetic unit 105 will be described later.

The mixer 107 performs the mixing of the omitted information, and the audio signal 155 with the noise being generated by the seek operation of the disk device 110 at most and then being removed, is temporarily stored in a buffer memory 109 and then it is recorded in the disk device 110.

Here a function of a controller 108 will be described. The controller 108 controls the apparatus as a whole. Particularly in the case of this embodiment, the main function is in the issue of seek instruction to the disk device 110 and supervision of execution of the seek instruction, issue of instruction of record reproducing processing of the disk device 110, further issue of processing instruction of the arithmetic unit 105 and the mixer 107. In general, the controller 108 is constituted by a CPU (central processing unit), an arithmetic unit, a memory and the like.

Although the description gets out of order, when the disk device 110 performs the seek operation by the controller 108, since the seek sound generated then is inputted to a microphone 101, the sound to be the subject of sound recording originally may include an excessive noise. Here the processing to prevent such state will be described.

The controller 108 has functions of recording and reproducing of information to the disk device 110 and further the issue of the seek operation instruction to move the head so as to perform the recording and the reproducing. In this embodiment, the mixing of the noise called the seek sound during the seek executing in the digital information to be recorded actually to the disk device 110 must be prevented. Consequently the controller 108 must know when the seek instruction is to be issued during the recording. Also the time range from the time of the issue of the seek instruction to the time when the seek sound reaches a level to affect the sound to be recorded can be supposed well in response to the distance (S).

For example, the seek instruction is issued at the time 0, and it is known that the head existing in a track position A is moved to other track position B.

Consequently from the distance from A to B, the information can be obtained easily in that level (Ns) of the seek sound is large, and the period of the seek signal affecting as noise starts at the time α and is finished at the time β. This information may be stored previously in a ROM (read only memory), or may be stored in a control track region in the disk device 110.

In the following description, it is assumed that the period from the time α to the time β is the period of the seek sound affecting. In the period from the time α to the time β, the controller 108 executes operation that the digital information of the shift register 103 is omitted intentionally. In this constitution, even if the seek sound generated in the microphone 101, since the period affected actually is omitted intentionally, the influence is not produced. Simple effect occurs also in the shift register 104.

In this constitution, however, since the continuity as the audio signal is broken, the arithmetic unit 105 produces the information omitted in the omitting period, that is, from the time α to the time β, in the state that as if the information is not omitted, and moreover the seek sound does not affect.

Since the controller 108 performs various sorts of control of the disk device in such manner, the cut-off of the audio signal can be easily performed. Moreover, due to the producing of the omitted information by the arithmetic unit 105 and the interpolation processing by the mixer 107, the quality of the audio signal being a continuous signal is not deteriorated as possible and the influence of the seek sound is made as small as possible.

The information once recorded through such processing can be reproduced in conventional constitution. A signal read out from the disk device 110 is inputted to a buffer memory 109, and an audio signal 157 outputted from the buffer memory 109 is converted, in turn, from a digital signal to an analog signal by a D/A converter 111. The audio signal 158 converted into the analog signal is removed in high frequency component by the filter 112, and becomes a smoothed audio signal 159. Constitution after the audio signal 159 is omitted, but this is connected to a speaker and other analog recording apparatus and is utilized.

Operation of various components and input/output relation of signals between the components has been described. Next, processing of the arithmetic unit 105 in the style of this embodiment will be mainly described using an example of an audio signal. FIG. 2 shows an example of processing of removing the influence of the seek noise in the style of this embodiment based on constitution shown in FIG. 1. Here the information in the period affected by the seek sound is cut off, and a method is shown in that the information omitted in the cut-off period (Ts) is restored by the information interpolated by other means.

Figure 2A:
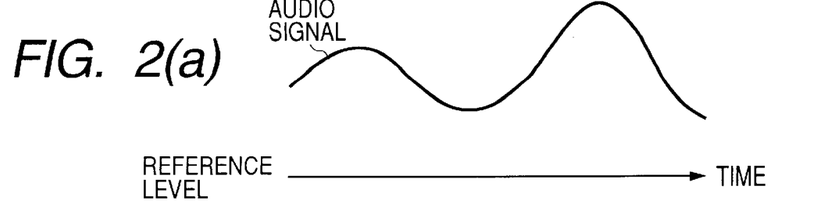
FIGS. 2(a) to 2(e) are concept diagrams showing an example of function of a continuous information recording apparatus being an embodiment of the invention.
Figure 2B:
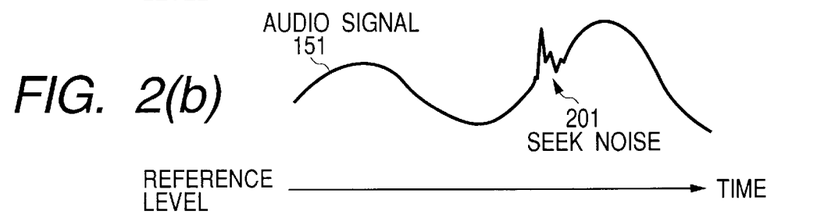
Figure 2C:
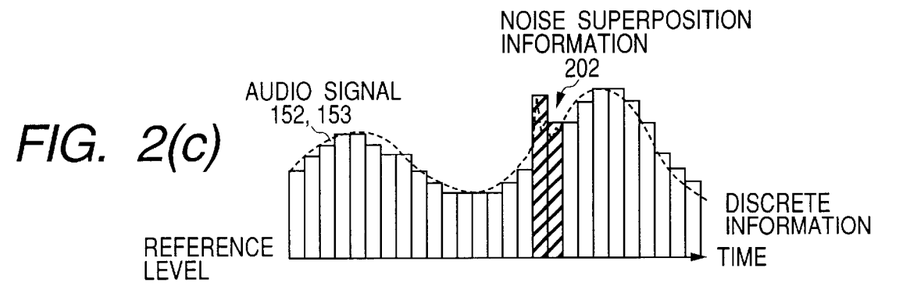
Figure 2D:
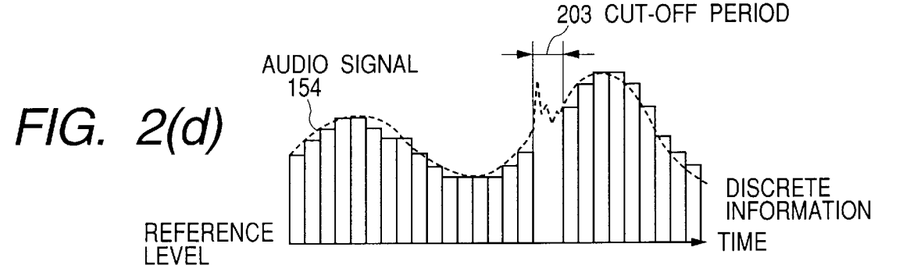

FIG. 2(a) shows an example of waveform of a sound 150 inputted to a microphone 101. In original state, a digitalized signal of the audio signal 150 is recorded in the disk device 110. Here as shown in FIG. 2(b), it is assumed that the seek sound of the disk device 110 is generated in the level being not neglected during some period. The superposed state of the seek noise 201 to the audio signal 151 is shown. In the disk device 110, when the seek distance is relatively short, or when the amplitude level (V) of the sound 150 inputted to the microphone 101 is relatively high, even if the seek sound is sensed by the microphone 101, when the signal actually recorded is to be reproduced, the seek sound may be in level not felt unpleasantly by human ears. In the example of FIG. 2(b), the case that the seek noise 201 which cannot be neglected for the audio signal 151 is superposed. FIG. 2(c) shows the state that the audio signal 151 is made discrete by the A/D converter 102. In the part where the seek noise is generated, as seen in the noise superposition information 202, the level becomes different from the discrete level to be originally. The part shown in hatching in FIG. 2(c) corresponds to this state. In the style of this embodiment, as shown in FIG. 2(d), the period where the noise superposition information exists is omitted intentionally as the cut-off period 203. In this constitution, the influence of the seek noise can be removed.

Figure 2E:
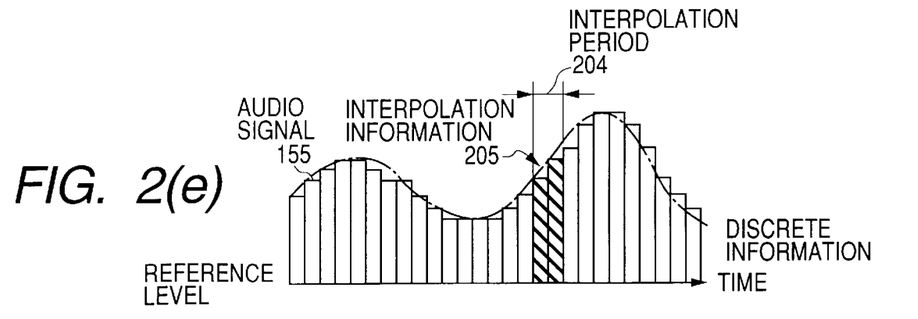

In this constitution, however, the audio information is lost only in the cut-off period, and every unnatural reproducing is generated. In order that the cut-off period 203 is interpolated and the original audio signal, as shown in FIG. 2(*a*), is realized as possible, the information in the omitted period is interpolated from the other information by the arithmetic unit 105, and processing is performed in that the interpolation information 205 is embedded as the cut-off period 203, that is, as the interpolation period 204. In this constitution, as shown in FIG. 2(*e*), the audio signal 155 is produced, and if the audio signal 155 is recorded in the disk device 110, the influence of the seek noise 201 can be reduced.

As pointed out also in the description, due to difference of the seek distance or due to difference of the sound amplitude level of the sound 150 inputted to the microphone 101, the time width of the cut-off period 203 is optimized. Thus, the information does not become unnatural and the influence of the seek noise can be reduced.

Figure 3A:
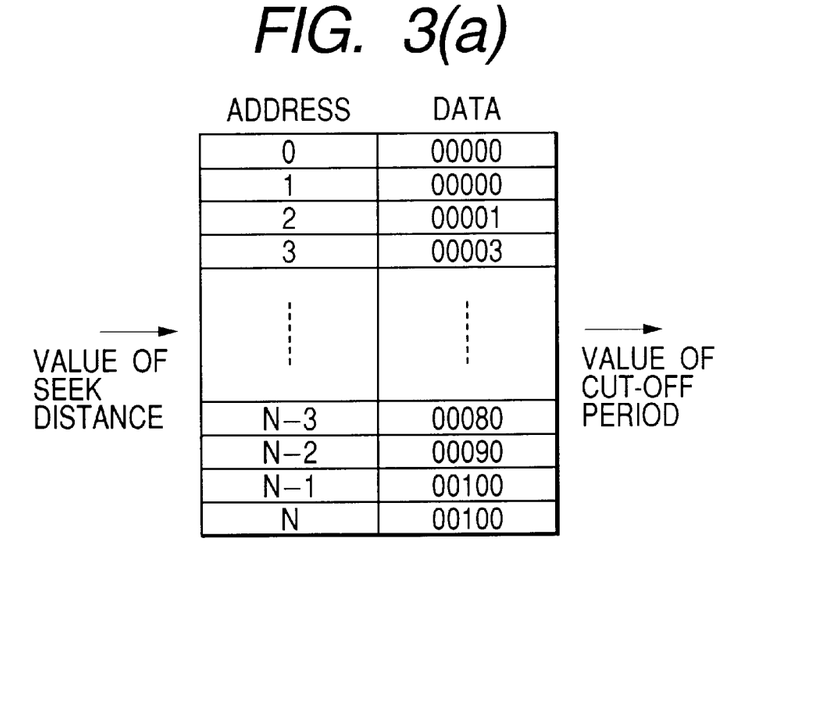
FIGS. 3(a) and 3(b) are concept diagrams showing an example of a table to be used in a continuous information recording apparatus being an embodiment of the invention.

FIG. 3(*a*) shows a typical seek distance table 401 for outputting a cut-off period in response to the seek distance. In the actual state, as addresses of a ROM (read only memory), the seek distance (S) is inputted from the controller 108 and the cut-off period (Ts) may be outputted as data for each address. In the example of FIG. 1, since the clock 121 is the time reference, the cut-off period (Ts) does not outputted as actual time values but outputted as data expressed in the clock number. In addition, in place of the seek distance, the seek track number is used and the cut-off period (Ts) may be outputted as data, or the cut-off period (Ts) corresponding to the seek distance or the seek track number may be estimated by arithmetic calculation and outputted in place of holding the table.

Figure 3B:
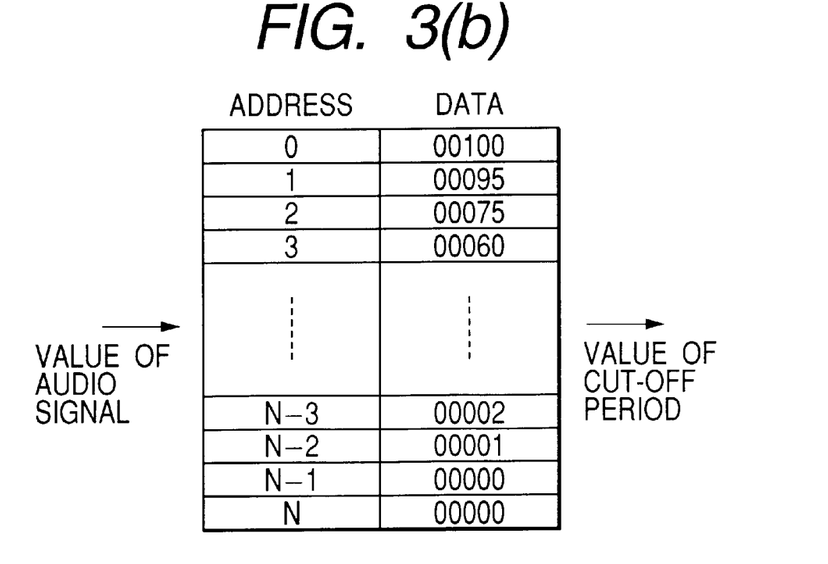

FIG. 3(*b*) shows a typical sound level table 402 outputting a cut-off period (Ts) in response to a level (V) of the audio signal 151. In this case, however, a decision cannot be effected in the stage of audio signal 152 whether the sound is a sound to be recorded originally or a sound superposed by a seek sound. Consequently when the table is applied actually, averaging of a several pieces of past data of the audio signal 152 in discrete state must be performed. For example, even if the seek sounds are superposed in the period from the discrete sample number n to m, a moving average of a plural sample number preceding the sample number n−1 may be taken. Thus, probability of wrong recognition that the level increase in the superposition period of the seek sound is the original level will be low.

The seek distance table 401 as shown in FIG. 3(*a*) and the sound level table 402 as shown n FIG. 3(*b*) can be applied simultaneously. Product or sum of the cut-off period in both tables can be used as the cut-off period to be used finally. For example, when the seek distance is long, the level of the seek noise is increased, but if the level of the input sound is higher than the increased level, or if the seek noise level is negligible level with respect to the input sound level, in a case where the cut-off period 203 is not provided and the recording to the disk device 110 is performed, the influence of the seek noise is little, and since the cut-off period is not provided, the continuity of the sound does not become unnatural.

Figure 4:
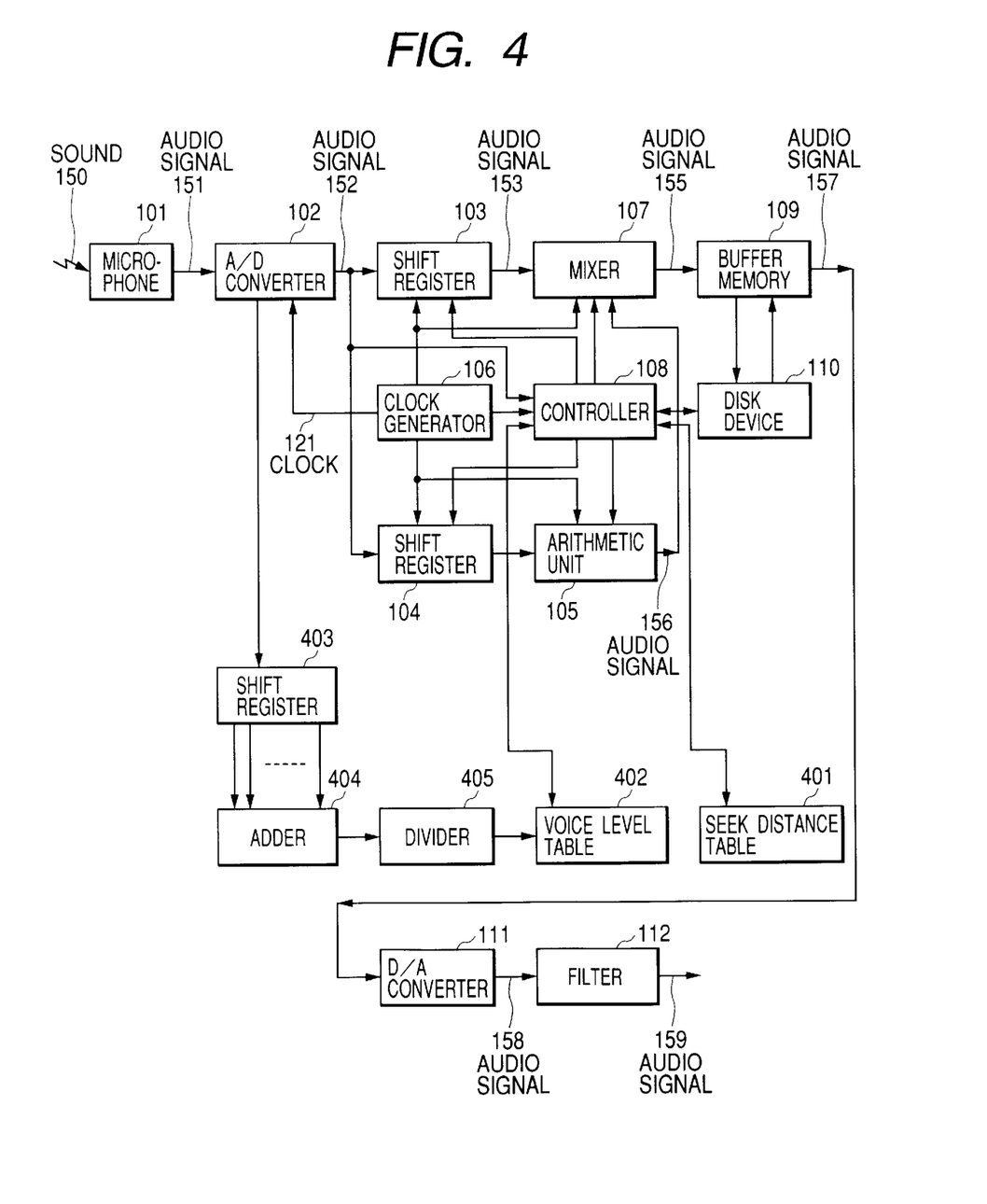
FIG. 4 is a block diagram showing an example of internal constitution of a continuous information recording apparatus more in detail being an embodiment of the invention.

In FIG. 4, components in the case of determining the cut-off period are added, in comparison with the constitution shown in FIG. 1, using the table as shown in FIG. 3. More specifically, a seek distance table 401 and a sound level table 402 are added as ROM, further a shift register 403, an adder 404, a divider 405 for calculating the moving average are added at the rear stage of the A/D converter 102. The moving average can be estimated in that preceding several sound level values including a sound level at certain time are added, and the added value is divided by the adding level number. Although an example constituted by the hardware is shown, the moving average can be estimated by operation using a controller 108 as software or CPU separately installed.

Figure 5:
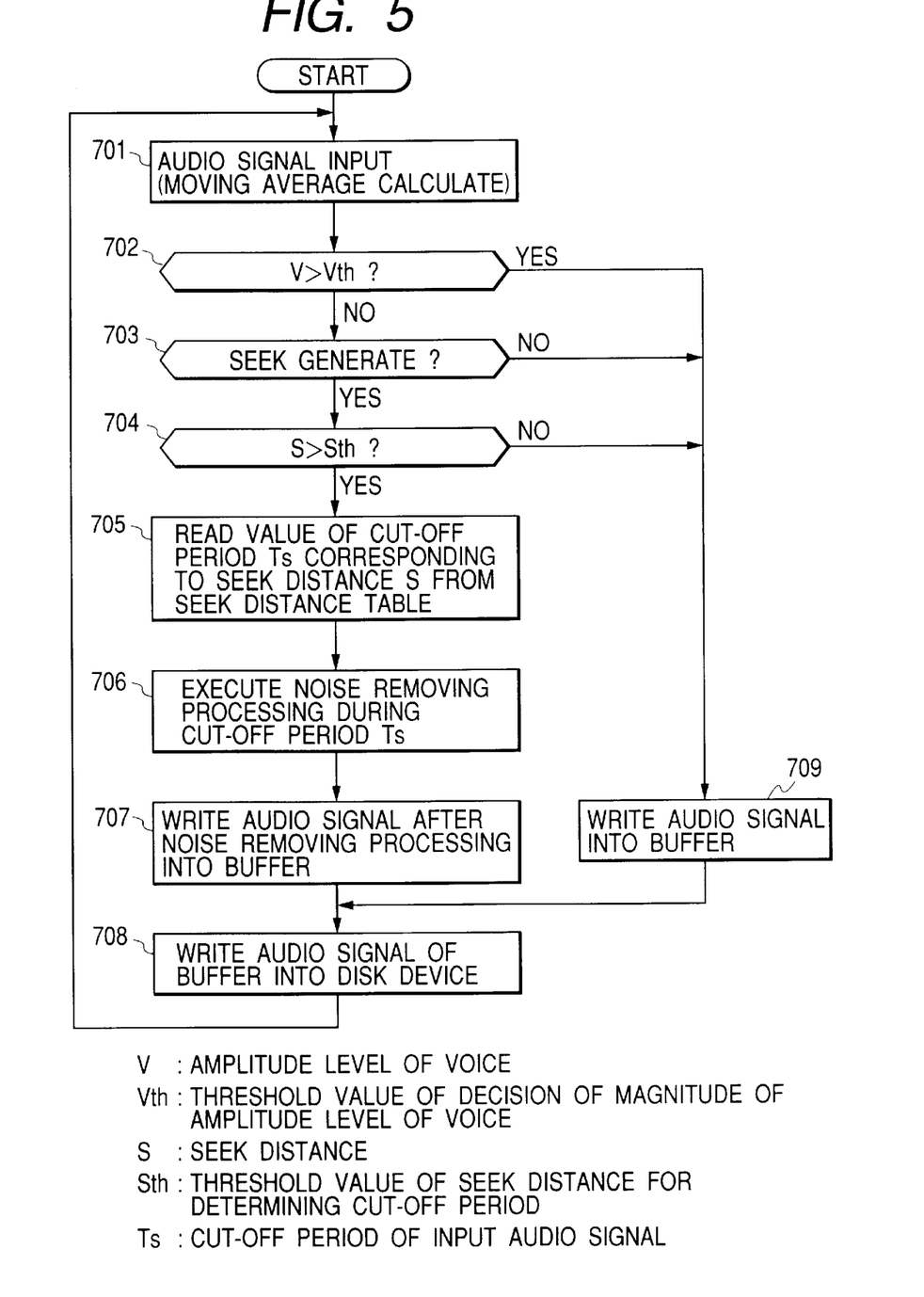
FIG. 5 is a flow chart showing an example of function of a continuous information recording apparatus being an embodiment of the invention.

FIG. 5 is a flow chart showing an example of the function of the first embodiment in the constitution as shown in FIG. 4.

At first, the moving average is calculated from an inputted audio signal 151 (step 701). Decision is effected whether or not the amplitude level (V) in the inputted audio signal is larger than the prescribed threshold value Vth (step 702). If the amplitude level (V) is larger than the threshold value Vth (V>Vth), noise of the seek sound is embedded in the audio signal 151 and is not noticeable and the decision is effected that it need not be removed, and the inputted audio signal 151 need not be subjected to noise removing processing such as cut-off or interpolation, and is stored as it is in the buffer memory 109 (step 709), and is recorded in the disk device 110 (step 708).

In step 702, if V≦Vth, the noise of the seek sound is not embedded in the audio signal 151, and decision is effected that it must be removed, and further decision is effected whether or not the seek is generated (step 703). If the seek is generated, further decision is effected whether or not the seek distance (S) is larger than the threshold value Sth or not (step 704). If the seek distance (S) is larger than the threshold value Vth, the value of the cut-off period (Ts) corresponding to the seek distance (S) is read out from the seek distance table 401 (step 705). The noise removing processing by the data interpolation processing as exemplified in FIG. 2 is executed during the cut-off period (Ts) only (step 706). The audio signal after the removing processing is stored in the buffer memory 109 (step 707), and is recorded in the disk device 110 (step 708).

If the seek is not generated in step 703, and in step 704, if the seek distance is the threshold value or less (S≦Sth), and the seek sound is small and the decision is effected that the noise removing processing is unnecessary, the inputted audio signal 151 is not subjected to the noise removing processing such as the cut-off or interpolation, but the audio signal is stored as it is in the buffer memory 109 (step 709), and is recorded in the disk device 110 (step 708).

As described above, according to the first embodiment, in the continuous information recording apparatus adopting the disk device 110 having the head for the recording and reproducing as the recording means, even when the noise (seek sound) is generated attendant on the moving of the head, and even when the noise is mixed in the sound information to be the recording subject originally, the influence of the noise is not produced in the record information.

Also since the disk device 110 with the seek sound generating need not be accommodated in the special case for the sound preventing the trouble such as the difficulty of heat radiation, the weight increase, and the cost increase is not produced.

Also, since excessive parts such as a microphone for noise canceling and a speaker are not used in addition to the microphone 101, there is no fear of increasing the noise due to the erroneous operation of the microphone, the speaker or the like on the contrary, and the cost increase is not produced.

Also in order to prevent noise, the special movable mechanism so as to move the position in the disk device 110 generating the seek sound need not be provided, and there is no fear of the deterioration of the durability.

Second Embodiment

Figure 6:
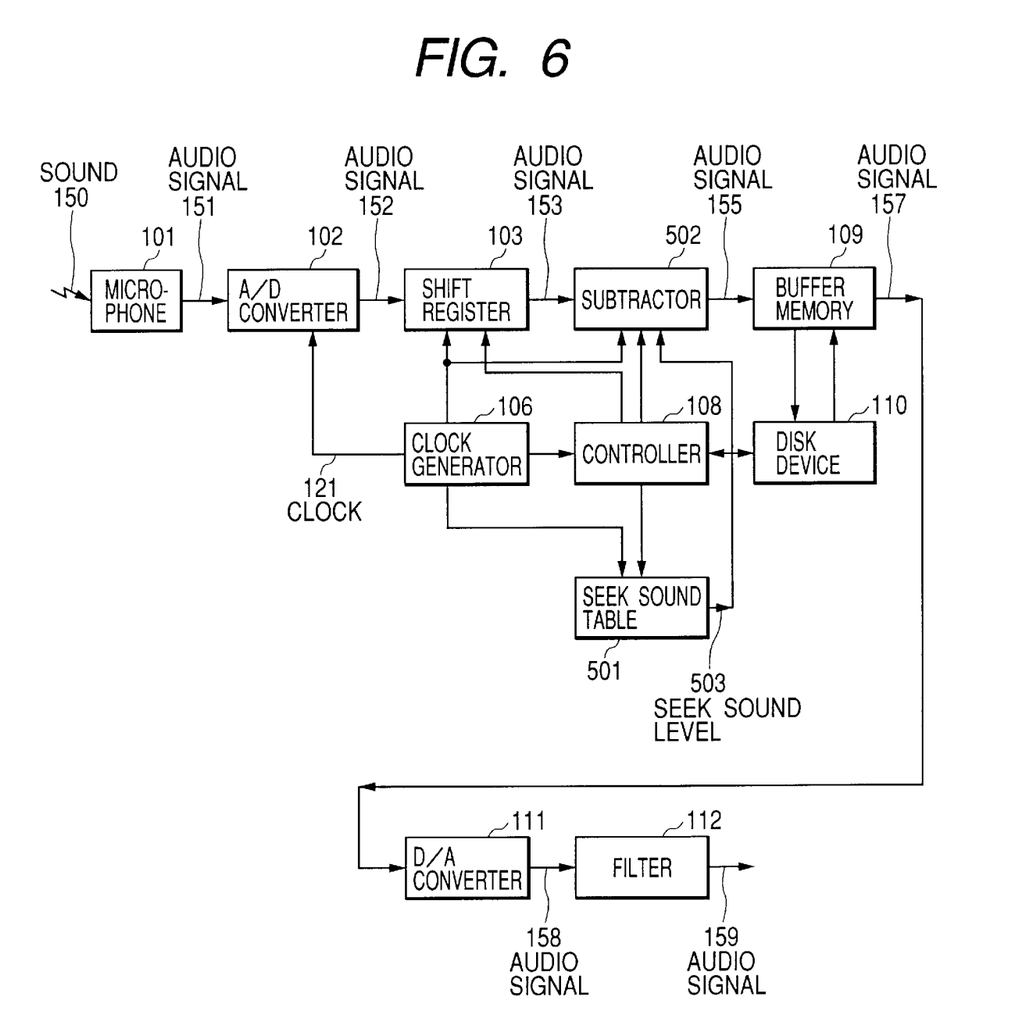
FIG. 6 is a block diagram showing an example of constitution of a continuous information recording apparatus being another embodiment of the invention.
Figure 7A:
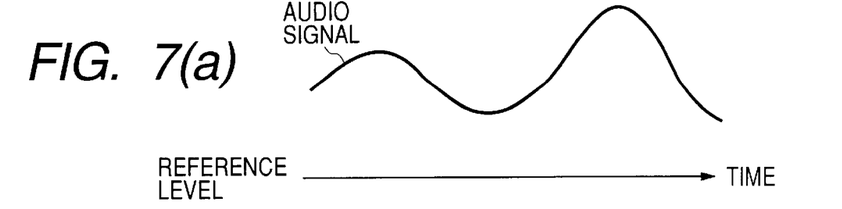
FIGS. 7(a) to 7(e) are concept diagrams showing an example of function of a continuous information recording apparatus being another embodiment of the invention.
Figure 7B:
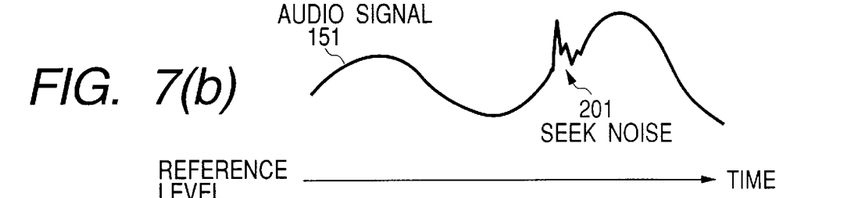
Figure 7C:
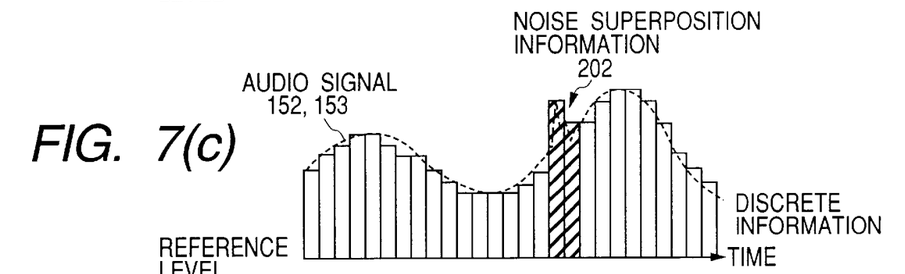
Figure 7D:
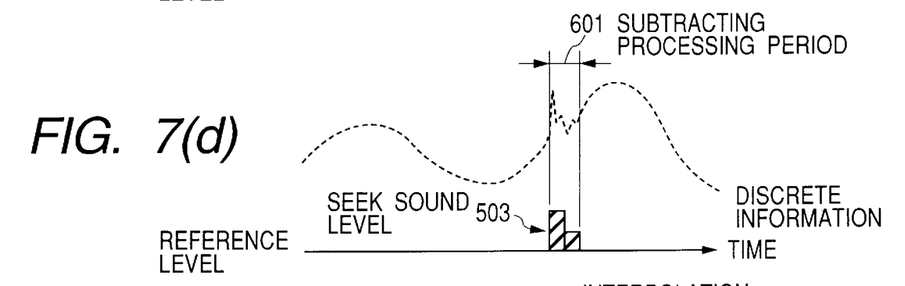
Figure 7E:
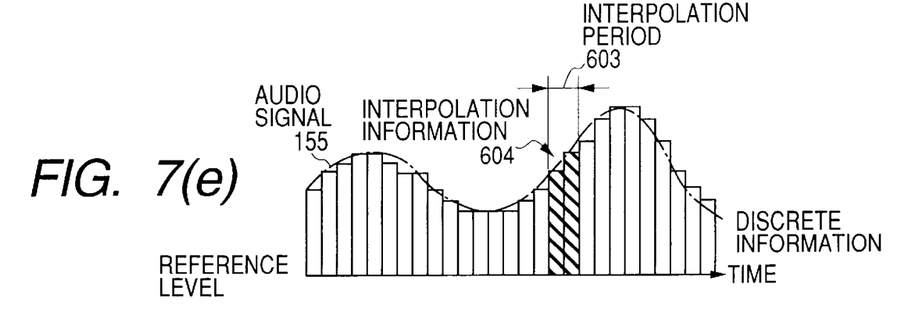

FIG. 6 shows another embodiment different from FIG. 1. Using constitution shown in FIG. 6, data of a seek sound table 501 holding level of a seek sound generated corresponding to the seek distance previously are referred to, and the seek sound level is subtracted from the audio signal 153 by the subtractor 502. Consequently such state can be prevented that seek sound as the noise is mixed in the sound 150 and is recorded in the disk device 110.

Components added to the constitution in FIG. 1 in comparison with FIG. 1 are a seek sound table 501 and a subtrator 502. The controller 108 inputs the seek distance to the seek sound table 501, receives the corresponding seek sound level 503 from the seek sound table 501, delivers it to the subtractor 502, and commands the subtracting processing to the audio signal 153 and the seek sound level 503.

Figure 8:
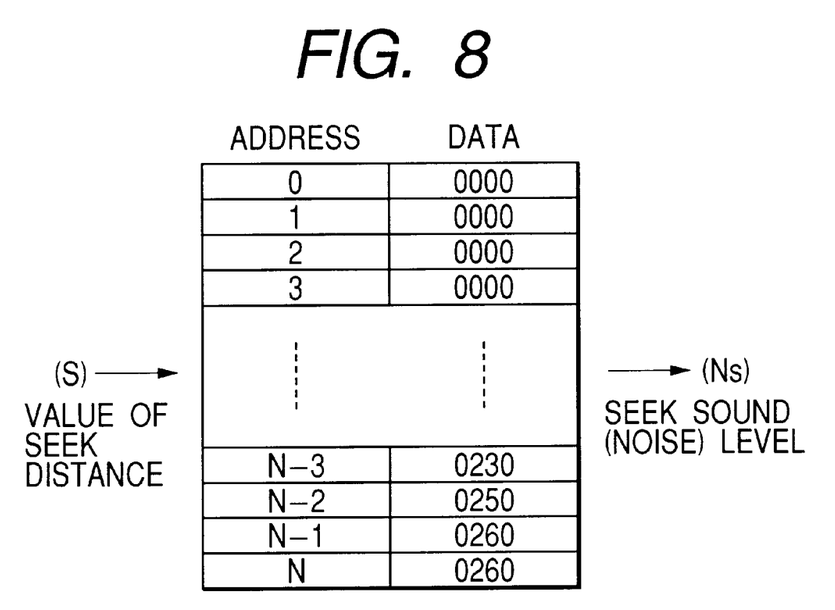
FIG. 8 is a concept diagram showing an example of a table to be used in a continuous information recording apparatus being another embodiment of the invention.

FIG. 8 shows typical constitution of the seek sound table 501. In each data with the seek sound level 503 (Ns) generating at the state of the seek distance (S) is stored.

FIG. 7 is a diagram showing states of the seek noise reduction by the constitution of FIG. 6. FIG. 7(a) to FIG. 7(c) are similar to FIG. 2(a) to FIG. 2(c) respectively. FIG. 7(d) shows a seek sound level 503 read from the seek sound table 501. When the seek distance is in the state where a seek sound level is set to 0. In the subtracting processing period 601 (interpolation period 603) during the seek, the seek sound level 503 is subtracted from the audio signal 153 (noise superposition information 202) by the subtractor 502 and the interpolation information 604 is generated. Thus as shown in FIG. 7(e), finally the influence of the seek sound is reduced from the noise superposition information 202 and the audio signal 150 can be obtained.

Figure 9:
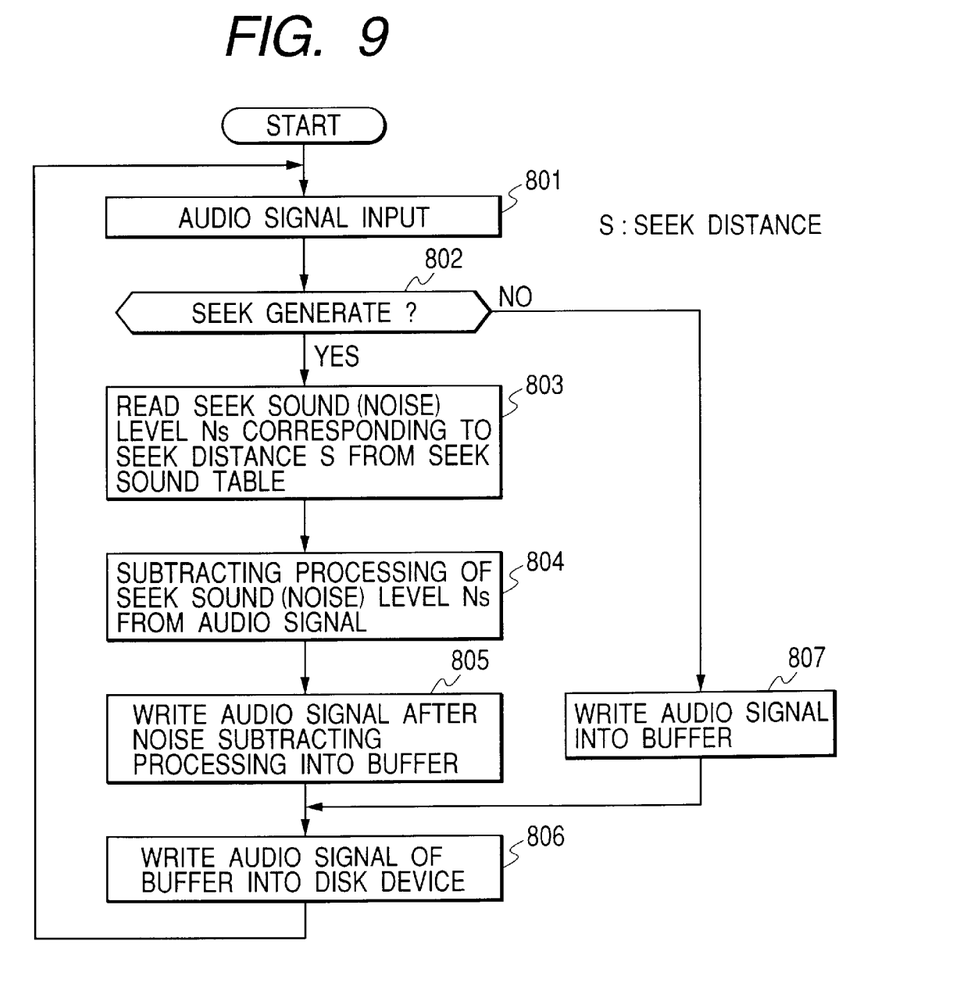
FIG. 9 is a flow chart showing an example of function of a continuous information recording apparatus being another embodiment of the invention.

FIG. 9 is a flow chart showing a typical function of the second embodiment in the constitution of FIG. 6 as described above.

At first, after the audio signal 151 is inputted (step 801), a decision is effected whether or not the seek is generated (step 802). If the seek is not generated, the inputted audio signal 151 is not subjected to the noise removing processing such as the subtracting processing, and is stored as it is in the buffer memory 109 (step 807), and is recorded in the disk device 110 (step 806).

In step 802, when it is judged that the seek is generated, the seek sound level 503 (Ns) corresponding to the seek distance (S) of the seek is read out from the seek sound table 501 (step 803). Then, the seek sound level 503 (Ns) is subtracted from the audio signal 151 (step 804), and the sound signal 154 after the subtracting processing is written in the buffer memory 109 (step 805), and is recorded in the disk device 110 (step 806).

As described above, according to the second embodiment, similar effect to that of the first embodiment can be obtained, and removing of noise such as the seek sound from the audio signal can be performed more simply.

Third Embodiment

Figure 10:
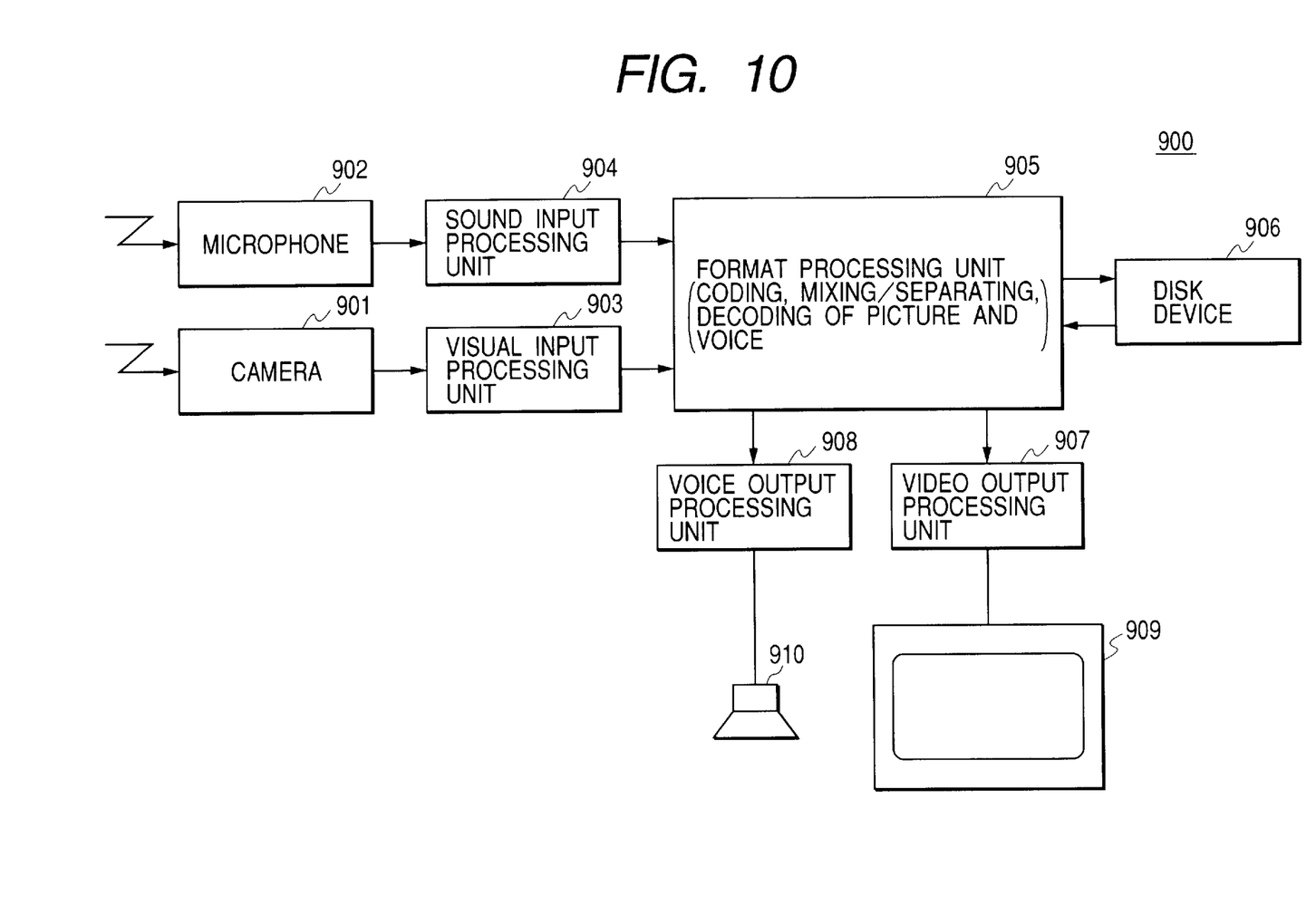
FIG. 10 is a block diagram showing an example of constitution of a continuous information recording apparatus as still another embodiment of the invention.

FIG. 10 is a concept diagram showing an example, where the technology in the first embodiment and the second embodiment as described above is applied to a sound recording system of a video camera 900 with sound recording function.

The video camera 900 in the third embodiment comprises a disk device 906 constituted by a disk device or the like having, for example, a rotary storage medium, a camera 901 for inputting picture information to be photographed constituted by an image pickup element, an optical system or the like, a microphone 902 for inputting a sound of a picture to be photographed or the like, a visual input processing unit 903 for processing of digitalizing a video signal inputted from the camera 901, a sound input processing unit 904 provided with a seek sound noise removing function of the storage means 906 in the first embodiment or the second embodiment as described above and digitalizing an audio signal, and a format processing unit 905 for combining the digitalized video signal and audio signal into a format suitable for a digital recording to the storage means 906 and for separating the video signal and the audio signal when reproducing the information stored in the disk device 906.

A video output processing unit 907 (audio output processing unit 908) where a video signal (audio signal reproduced from the storage means 906 is made visible (audible) and is outputted to a display 909 (speaker 910) is connected to the format processing unit 905.

In such a video camera 900, when a picture of the subject to be photographed is recorded, and at the same time, a sound of the subject is recorded and also recorded in the disk device 906, using the technology of the first embodiment and the second embodiment, it can be securely prevented that the seek sound of the disk device 906 becomes a noise and is recorded, and the recording of the video information including the audio information of high quality becomes possible.

Also when the video camera 900 is, for example, portable type, the disk device 906 may be used, for example, as a disk device of card type of detachable system. In this case, it is advantageous in that sound preventing measure need not be applied to a mechanical constitution of the disk device itself or the video camera 900, and noise caused by the seek sound of the disk device can be securely removed from the recording sound.

In other words, as the disk device 906, even if a disk device of any manufacturer is used, the noise caused by the seek sound of the disk device can be securely removed from the recorded sound.

Although the invention made by the present inventors has been described specifically based on the embodiments, the invention is not limited to the embodiments as described above, but various modifications can be made without departing from the subject matter of the invention.

As above described, according to the present invention, in a simple apparatus structure, effects are obtained in that when audio information or the like is recorded in storage means using a rotary storage medium, mixing of noise caused by a discontinuous sound such as seek sound generated from the storage means can be effectively prevented.

Also the trouble such as the difficulty of heat radiation, the weight increase, and the cost increase, is not produced, and effects are obtained in that when the audio information or the like is stored in the storage means using a rotary storage medium, mixing of noise such as seek sound generated from the storage means can be prevented.

Also the cost increase due to the adding of excessive parts, and the noise increase due to the erroneous operation and the like are not produced, and effects are obtained in that when the audio information or the like is recorded in the storage means using the rotary storage medium, mixing of noise such as a seek sound generated from the storage means can be prevented.

Further the apparatus body is not provided with a movable part which may cause the deterioration of the durability, and effects are obtained in that when the audio information or the like is recorded in the storage means using the rotary storage medium, mixing of noise such as a seek sound generated from the storage means can be prevented.

What is claimed is:

1. A continuous information recording apparatus, comprising:

a disk device including a rotary storage medium, and a head for recording information to the rotary storage medium;

a controller which cuts off audio input information during seek of the head when the audio input information is recorded to the rotary storage medium; and an arithmetic unit which performs interpolation of the audio input information omitted during a cut-off period, in which the controller cuts off the audio input information, based on the audio input information in either before the cut-off period or after the cut-off period.

2. A continuous information recording apparatus as set forth in claim 1, further comprising a table for storing the cut-off period.

3. A continuous information recording apparatus as set forth in claim 1, wherein said controller changes the length of the cut-off period in response to the seek distance.

4. A continuous information recording apparatus as set forth in claim 1, wherein said controller changes the length of the cut-off period in response to the sound amplitude level to be inputted.

5. A continuous information recording apparatus as set forth in claim 1, further comprising a table showing the correspondence of the seek distance and the length of the period to be cut-off, wherein the controller sets the period to be cut off referring to the table.

6. A continuous information recording apparatus as set forth in claim 1, further comprising a table showing the correspondence of the seek track number and the length of the period to be cut off, wherein the controller sets the period to be cut off referring to the table.

7. A continuous information recording apparatus as set forth in claim 1, further comprising an arithmetic unit for calculating the length of the period to be cut off from the seek distance.

8. A continuous information recording apparatus as set forth in claim 1, further comprising an arithmetic unit calculating the length of the period to be cut off from the seek track number.

9. A continuous information recording apparatus as set forth in claim 1, wherein the arithmetic unit holds the audio input information immediately before the period to be cut off thus interpolating the audio input information omitted during the cut-off period.

10. A continuous information recording apparatus as set forth in claim 1, wherein the arithmetic unit calculates the audio input information before the cut-off period by extrapolation-applying the approximation formula thereto, thus interpolating the audio input information omitted during the cut-off period.

11. A continuous information recording apparatus as set forth in claim 1, wherein the arithmeti8c unit calculates the audio input information before and after the cut-off period by interpolation-applying the approximation formula thereto, thus interpolating the audio input information omitted during the cut-off period.

12. A continuous information recording apparatus, comprising:

a disk device including a rotary storage medium, and a head for recording audio input information to the rotary storage medium;

a table for storing the level of a seek sound; and a subtractor which subtracts the audio input information by the level read out from the table during a seek of the head when the audio input information is recorded in the rotary storage medium.

13. A continuous information recording apparatus as set forth in claim 12, further comprising a table for storing the period to be subtracted.

14. A continuous information recording apparatus as set forth in claim 12, further comprising a controller for instructing the subtracting processing to the subtractor wherein the controller changes the length of the period to be subtracted in response to the seek distance.

15. A continuous information recording apparatus as set forth in claim 14, wherein the controller changes the length of the period to be subtracted in response to the sound amplitude level to be inputted.

16. A continuous information recording apparatus as set forth in claim 14, further comprising a table showing the correspondence of the seek distance and the length of the period to be subtracted, wherein the controller sets the period to be subtracted referring to the table.

17. A continuous information recording apparatus as set forth in claim 14, further comprising a table showing the correspondence of the seek track number and the length of the period to be subtracted, wherein the controller sets the period to be subtracted referring to the table.

18. A continuous information recording apparatus as set forth in claim 12, further comprising an arithmetic unit for calculating the length of the period to be subtracted from the seek distance.

19. A continuous information recording apparatus as set forth in claim 12, further comprising an arithmetic unit for calculating the length of the period to be subtracted form the seek track number.

20. A continuous information recording apparatus, comprising:

recording means including a rotary storage medium, and a head for recording information to the rotary storage medium;

control means for controlling an audio input information during the seek of the head when the audio input information is recorded to the rotary storage medium; and interpolation means for performing interpolation of the audio input information during a controlled period, in which the control means controls the audio input information, based on the audio input information in either before the controlled period or after the controlled period.

* * * * *